United States Patent
Ruffier et al.

(10) Patent No.: US 9,797,919 B2
(45) Date of Patent: Oct. 24, 2017

(54) MOTION SENSOR ASSEMBLY FOR DETERMINING THE ANGULAR VELOCITY OF A MOVING CONTRAST IN ITS FIELD OF VIEW WITH A HIGH ACCURACY

(71) Applicants: Universite d'Aix—Marseille, Marseille (FR); Centre National De La Recherche Scientifique (C.N.R.S), Paris (FR)

(72) Inventors: Franck Ruffier, Marseilles (FR); Fabien Expert, Aubagne (FR)

(73) Assignees: UNIVERSITE D'AIX MARSEILLE, Marseille (FR); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 68 days.

(21) Appl. No.: 14/438,601

(22) PCT Filed: Oct. 17, 2013

(86) PCT No.: PCT/EP2013/071738
§ 371 (c)(1),
(2) Date: Apr. 24, 2015

(87) PCT Pub. No.: WO2014/063989
PCT Pub. Date: May 1, 2014

(65) Prior Publication Data
US 2015/0285833 A1   Oct. 8, 2015

(30) Foreign Application Priority Data
Oct. 26, 2012   (EP) .................................... 12306341

(51) Int. Cl.
G01P 3/38      (2006.01)
G01P 3/68      (2006.01)
G01S 11/12     (2006.01)

(52) U.S. Cl.
CPC .................. *G01P 3/38* (2013.01); *G01P 3/68* (2013.01); *G01S 11/12* (2013.01)

(58) Field of Classification Search
CPC ............... G01P 3/64; G01P 3/68; F42B 35/00
See application file for complete search history.

(56) References Cited

U.S. PATENT DOCUMENTS

| | | | | |
|---|---|---|---|---|
| 4,461,477 A | * | 7/1984 | Stewart | A63B 69/0002 434/247 |
| 4,483,614 A | * | 11/1984 | Rogers | G01P 5/26 250/461.1 |
| 6,414,747 B1 | * | 7/2002 | Hardy | F42B 35/00 273/371 |

FOREIGN PATENT DOCUMENTS

WO     WO 2011/073085     6/2011

OTHER PUBLICATIONS

Frederic L. Roubieu et al., A novel 1-gram insect based device measuring visual motion along 5 optical directions:, 2011 IEEE Sensors Proceedings: Limerick, Ireland, Oct. 28-31, 2011.
(Continued)

*Primary Examiner* — Luke Ratcliffe
(74) *Attorney, Agent, or Firm* — Knobbe, Martens, Olson & Bear, LLP

(57) ABSTRACT

A motion sensor assembly is adapted to determine an angular velocity of a moving contrast in its field of view. The motion sensor assembly includes: a motion sensor with a first and a second analog photoreceptor each adapted for observing the moving contrast, the first and the second photoreceptors being separated by a predetermined inter-receptor angle; and an angular velocity calculating unit
(Continued)

connected to the first and second photoreceptors for calculating the angular velocity of the moving contrast based on a first and a second analog signal delivered by the first and the second photoreceptors, respectively. The first and the second analog signals delivered by the first and the second photoreceptors at are sampled a given sampling frequency to obtain a first and a second digital signal, respectively. An interpolator is configured to interpolate the first and the second digital signals upon their crossing a predetermined threshold between successive samples.

19 Claims, 3 Drawing Sheets

(56) References Cited

OTHER PUBLICATIONS

Pudas et al., A minature bio-inspired optic flow sensor based on low temperature co-fired ceramics (LTCC) technology:, Sensors and Actuators A, Elsevier Sequoia S.A., Lausanne, CH, vol. 133, No. 1, Dec. 20, 2006 (Dec. 20, 2006), pp. 88-95.

Fabien Expert et al., Interpolation based time of travel scheme in a Visual Motion Sensor using a small 2D retina:, Sensors, 2012 IEEE, IEEE, Oct. 28, 2012 (Oct. 28, 2012), pp. 1-4.

International Search Report dated Apr. 9, 2014 for PCT/EP2013/071738.

* cited by examiner

MOTION SENSOR ASSEMBLY FOR DETERMINING THE ANGULAR VELOCITY OF A MOVING CONTRAST IN ITS FIELD OF VIEW WITH A HIGH ACCURACY

FIELD OF THE INVENTION

The present invention relates generally to a method of determining multi-dimensional angular velocity of a moving contrast using a motion sensor assembly.

DESCRIPTION OF THE RELATED ART

Motion sensor assemblies and methods for determining the angular velocity of a moving contrast using a motion sensor assembly are known from the article entitled "A novel 1-gram insect based device measuring visual motion along 5 optical directions" by Frédéric L. Roubieu et al, IEEE, 2011 (hereafter referred to as "article A").

However, the known assemblies and methods are limited to a comparatively small number of photoreceptors. Also, only the one-dimensional angular speed can be measured.

Thus, it is desirable to improve the above assembly and method such that a multi-dimensional angular velocity can be measured and larger photoreceptor arrays can be used, while keeping the desired measurement accuracy.

SUMMARY

The present invention relates to a motion sensor assembly adapted to determine the angular velocity of a moving contrast in its field of view, said motion sensor assembly comprising:
- at least one motion sensor with a first and a second analog photoreceptor each adapted for observing said moving contrast, wherein said first and second photoreceptor are separated by a predetermined interreceptor angle; and
- an angular velocity calculating unit connected to said photoreceptors for calculating the angular velocity of the moving contrast based on the first and second analog signal delivered by said first and second photoreceptor respectively;

wherein said angular velocity calculating unit comprises a means for temporally sampling the first and second analog signal delivered by said first and second photoreceptor at a given sampling frequency to obtain a first and second digital signal respectively.

The present invention also relates to a vehicle, such as a terrestrial, maritime or aerial vehicle, a Micro Aerial Vehicle, motor vehicle, drone or space vehicle, equipped with a motion sensor assembly.

The present invention also relates to a method for determining the angular velocity of a moving contrast.

Thus, an object of the present invention is to improve the assembly described in article A and method such that a multi-dimensional angular velocity can be measured and larger photoreceptor arrays can be used, while keeping the desired measurement accuracy.

According to the invention, this object is achieved by a motion sensor assembly as defined above wherein said angular velocity calculating unit further comprises a means for performing an interpolation of said first and second digital signal when they cross a predetermined threshold between successive samples.

The object of the present invention is also achieved by a method for determining the angular velocity of a moving contrast, the method comprising the steps of:
- obtaining a first and second analog signal by observing said moving contrast from two different photoreceptors separated by a predetermined interreceptor angle; and
- temporally sampling the first and second analog signal at a given sampling frequency to obtain a first and second digital signal,
- the method being characterised by the step of performing an interpolation of said first and second digital signal when they cross a predetermined threshold between successive samples.

Thanks to the inventive interpolation step on the visual signals, the calculation charge decreases considerably with no noticeable loss in measurement precision. Hence, more photoreceptors can be used for a given calculation capacity.

Another advantage of the present invention is that the interpolation is done on visual signals with a sampling frequency which is much lower than the sampling frequency used in the state of the art.

According to preferred embodiments, the motion sensor assembly of the invention has one or several of the following features, taken in isolation or in all technically possible combinations:
- the interpolation means comprises:
  - a means for detecting the crossing, by the first and second digital signal, of the predetermined threshold;
  - a means for interpolating:
    a) the time interval between threshold crossing by the first digital signal and the next sample of the first digital signal; and
    b) the time interval between threshold crossing by the second digital signal and the next sample of the second digital signal; and
  - a means for estimating the delay in threshold crossing between the first and second digital signal based on the interpolated time intervals; and
- the interpolation means comprises:
  - a means for detecting the crossing, by the first and second digital signal, of a predetermined threshold;
  - a means for interpolating the time of threshold crossing by the first digital signal and the time of threshold crossing by the second digital signal; and
  - estimating the delay in threshold crossing between the first and second digital signal based on the interpolated times;
- said angular velocity calculating unit further includes a means for calculating the angular velocity by dividing said interreceptor angle by said estimated delay;
- said angular velocity calculating unit further comprises a filter, preferably low-pass, outputting a first and a second filtered digital signal from the first and the second digital signals;
- said sampling frequency is between 0.01 and 1000000 Hz, and preferably equal to about 200 Hz;
- the motion sensor assembly comprises a preferably 3×4 array of photoreceptors; and
- the calculating unit comprises a microcontroller.

According to preferred embodiments, the method of the invention has one or several of the following features, taken in isolation or in all technically possible combinations:
- the interpolation step comprises:
  - detecting the crossing, by the first and second digital signal, of a predetermined threshold;
  - interpolating:

a) the time interval between threshold crossing by the first digital signal and the next sample of the first digital signal; and
b) the time interval between threshold crossing by the second digital signal and the next sample of the second digital signal; and
estimating the delay in threshold crossing between the first and second digital signal based on the interpolated time intervals; and the interpolation step comprises:
detecting the crossing, by the first and second digital signal, of a predetermined threshold;
interpolating the time of threshold crossing by the first digital signal and the time of threshold crossing by the second digital signal; and
estimating the delay in threshold crossing between the first and second digital signal based on the interpolated times;

a filtering step is provided outputting a first and a second filtered digital signal from the first and the second digital signals;
the method further includes the step of calculating the angular velocity by dividing said interreceptor angle by said estimated delay;
said sampling frequency is between 100 and 500 Hz, and preferably equal to about 200 Hz; and
said interpolation is a linear interpolation.

The invention also pertains to a terrestrial, maritime or aerial vehicle, such as a Micro Aerial Vehicle, motor vehicle, drone or space vehicle, equipped with a motion sensor assembly as defined above.

The invention will be better understood when reading the following description of non-limiting examples of the invention with reference to the accompanying figures.

DETAILED DESCRIPTION

Figure 1:
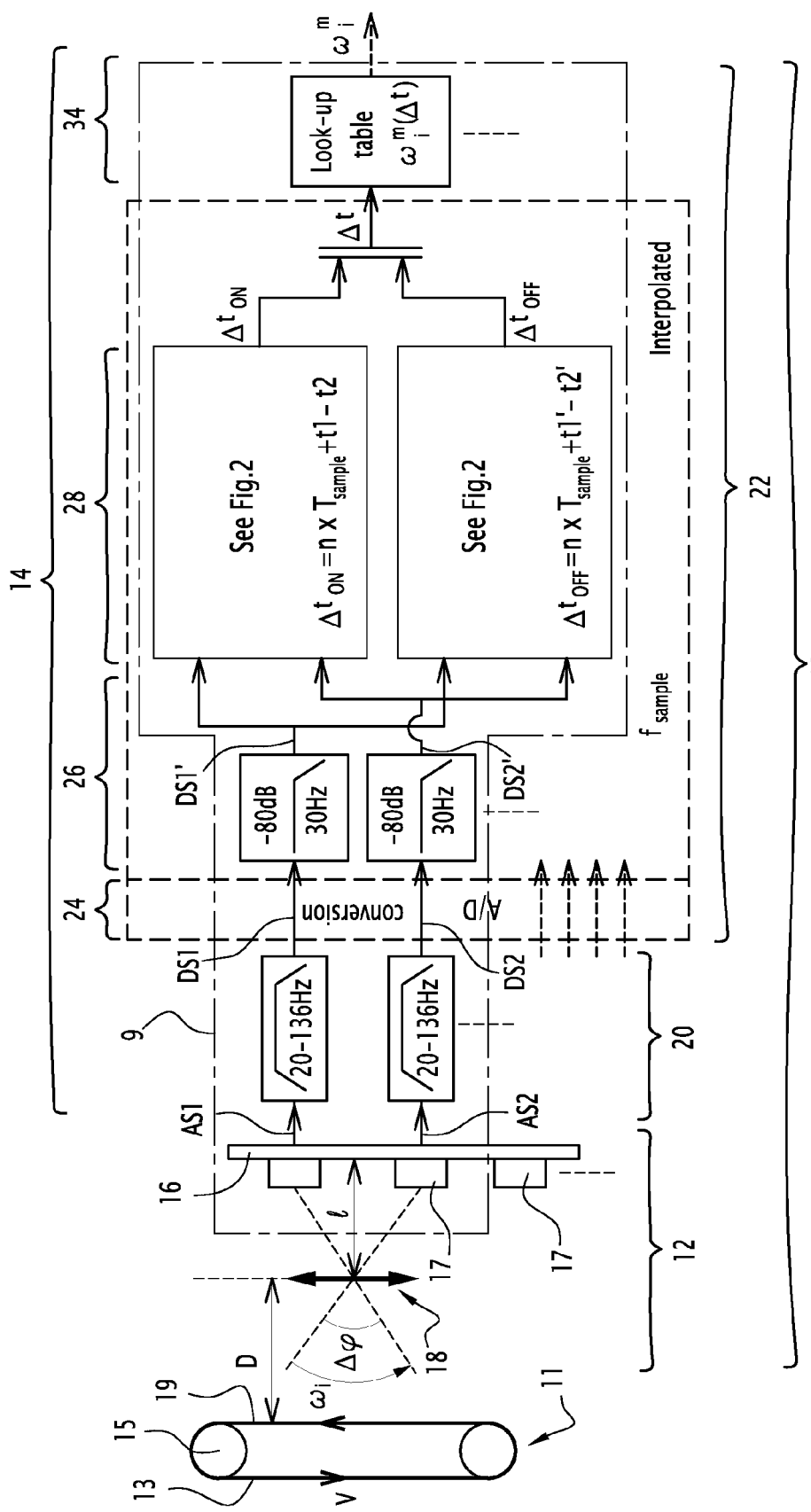
FIG. 1 is a block diagram of a motion sensor assembly according to the invention.

With reference to FIG. 1, there is shown a motion sensor assembly 10 and a moving object 11 placed at an orthogonal distance D from motion sensor assembly 10.

The moving object 11 is a printed and endless strip of wallpaper 13 that can be conveyed by two drums 15 at a speed V. The wallpaper print depicts natural contrasts, one of which is denoted by the number 19.

The motion sensor assembly 10 includes an optic assembly 12 and an angular velocity calculating unit 14 connected to the optic assembly 12.

The optic assembly 12 includes a photoreceptor array 16 having a plurality of photoreceptors 17 and a lens 18. The lens 18 is placed in front of the photoreceptor array 16 at a distance I such that the photoreceptors 17 have a Gaussian angular sensitivity function. Preferably, photoreceptors 17 are photodiodes. The interreceptor angle between two adjacent photoreceptors 17 is identified in FIG. 1 as $\Delta\varphi$. The photoreceptors 17 are each adapted to deliver an analog signal AS1, AS2, etc. to the angular velocity calculating unit 14.

The angular velocity calculating unit 14 is divided into an analog processing section 20 and a digital processing section 22.

The analog processing section 20, may be a 20 to 136 Hz bandpass filter. For example; an analog bandpass filter is provided comprising a high-pass filtering (fc=20 Hz) enhancing the contrast information and eliminating the DC component of the photoreceptor signals. This high pass filtering is followed by a low-pass filtering step (with fc=116 or 136 Hz) to avoid the phenomena of aliasing.

The digital processing section 22 comprises a first analog-to-digital conversion means or stage 24, and a second low-pass filtering means or stage 26, in order to output a first and second filtered digital signals DS1' and DS2' respectively.

Figure 2:
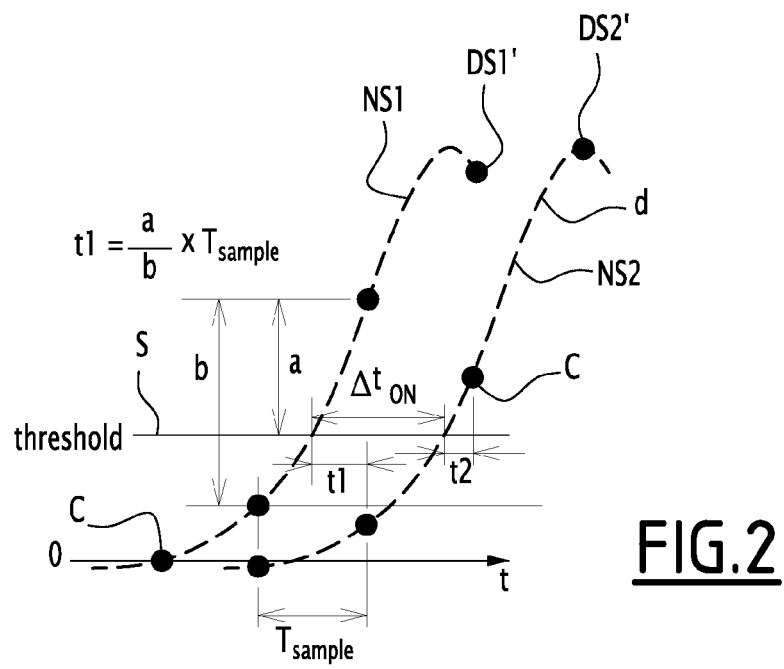
FIG. 2 is a graph illustrating the interpolation according to the invention.

Said digital processing section 22 further includes a third means for processing signals DS1' and DS2' which comprises a delay determining thresholding and interpolating stage in order to compute the time delay $\Delta t$ as illustrated by FIG. 2. The section 22 also includes a fourth means corresponding to an angular velocity calculating stage 34. The angular velocity calculating unit 14 is adapted to perform an angular velocity calculating algorithm.

The analog processing section 20 and the first, second and fourth means are similar to the corresponding elements described in article A. Article A's disclosure relating to these elements is hereby incorporated by reference.

However, the inventive angular velocity calculating algorithm is characterised by an additional step in between the digital filtering step 26 and the angular velocity calculating step 344. The additional step is carried out by the delay determining thresholding and interpolating the signals DS1' and DS2' stage 28 to compute the time delay $\Delta t$ between the filtered digital signals DS1' and DS2'.

One motion sensor 9 (delimited by the dashed frame) of the motion sensor assembly 10 comprises two adjacent photoreceptors 17 and the associated processing part of the angular velocity calculating unit 14.

With reference to FIG. 2, this additional stage/step will now be described in detail.

FIG. 2 is a plot of photoreceptor digital signal amplitude versus time. It shows a first digital signal DS1' and a second digital signal DS2' obtained with the inventive algorithm. The two digital signals DS1', DS2' correspond to the signals after digitalization and filtering coming from the two adjacent photoreceptors 17. Each digital signal DS1', DS2' is represented by a series of four dots C.

FIG. 2 also indicates a predetermined threshold S. This threshold S is determined by the delay determining step of the delay determining thresholding and interpolating stage 28. The crossing of threshold S by a signal is relative to the detection of a contrast.

For comparison, FIG. 2 also shows the digital signals NS1 and NS2 obtained using the algorithm known from article A. Each dash d represents one sampling point. NS1 and NS2 correspond to a sampling frequency of 2 kHz.

As one can see, according to the invention, the analog photoreceptor signals AS1, AS2 are sampled at a much lower frequency than the sampling frequency of NS1 and NS2. The signal between successive sampling points is then determined via interpolation.

More precisely, FIG. 2 illustrates how to calculate the delay $\Delta t_{ON}$ in threshold crossing between signal DS1' and signal DS2' using linear interpolation. The equation used for calculating $\Delta t_{ON}$ is:

$$\Delta t_{ON} = n \times T_{sample} + t1 - t2 \quad (1)$$

wherein n is the number of periods between the two signals DS1' and DS2', $T_{sample}$ is the sampling period, t1 is the time interval between the time of DS1"s threshold crossing and the next sampling time, and t2 is the time interval between the time of DS2"s threshold crossing and the next sampling time.

In the example shown in FIG. 2, n equals 1. More generally, the value of n is obtained via the delay determining stage 28.

The values of t1 and t2 are estimated by linear interpolation, i.e. with the following equation:

$$t1, t2 = a/b \times T_{sample} \quad (2)$$

wherein a is the difference between the signal amplitude at the next sampling time following the threshold crossing and the threshold S, and b is the difference in amplitude between the two sampling points surrounding the time of threshold crossing.

The additional step is added to the angular velocity calculating algorithm in order to be able to reduce the digital sampling frequency of the analog signals delivered by the photoreceptors 17 while essentially keeping the same measurement accuracy. In other words, according to the invention, when the visual signals are interpolated, the calculation of the optical flow is realized with a temporal accuracy superior than that of the previous art at the same frequency.

EXPERIMENTAL RESULTS

Figure 3:
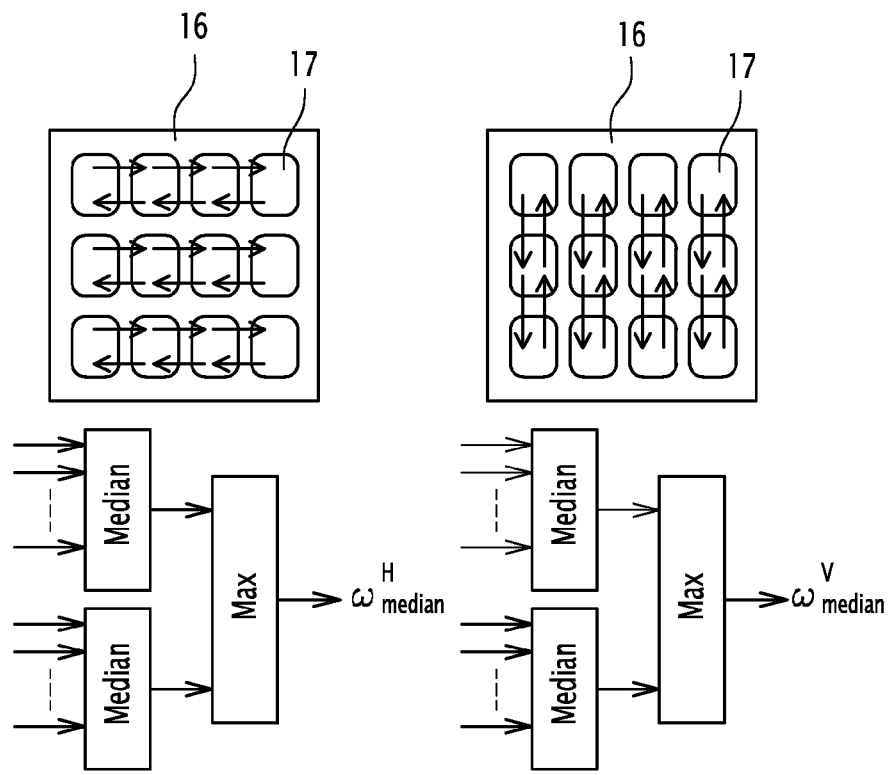
FIG. 3 is a diagram illustrating the determination of the horizontal and vertical angular speed according to the invention.

In order to determine the best sampling frequency for the new angular velocity calculating algorithm using interpolation, the experiment shown in FIG. 3 was performed.

An array 16 of 4×3 auto-adaptive analog Very Large Scale Integration (aVLSI) pixels 17 called APIS (Adaptive Pixels for Insect-based Sensors) was used for determining the horizontal angular speed $\omega_{median}^H$ and the vertical angular speed $\omega_{median}^V$ of a moving contrast. The horizontal angular speed $\omega_{median}^H$ was computed by taking the maximum value between the median value of the angular speed measurements in the positive horizontal direction and the median value of the angular speed measurements in the negative horizontal direction. The vertical angular speed $\omega_{median}^V$ was computed by taking the maximum value between the median value of the angular speed measurements in the positive vertical direction and the median value of the angular speed measurements in the negative vertical direction. The moving contrast was travelling with a known angular velocity profile having a saw tooth shape M (cf. FIG. 4) corresponding to an angular speed varying between 75°/s and 275°/s seen by the photoreceptors 17. The digital sampling was done at a frequency $f_{sample}$ of 100, 200 and 500 Hz.

Figure 4:
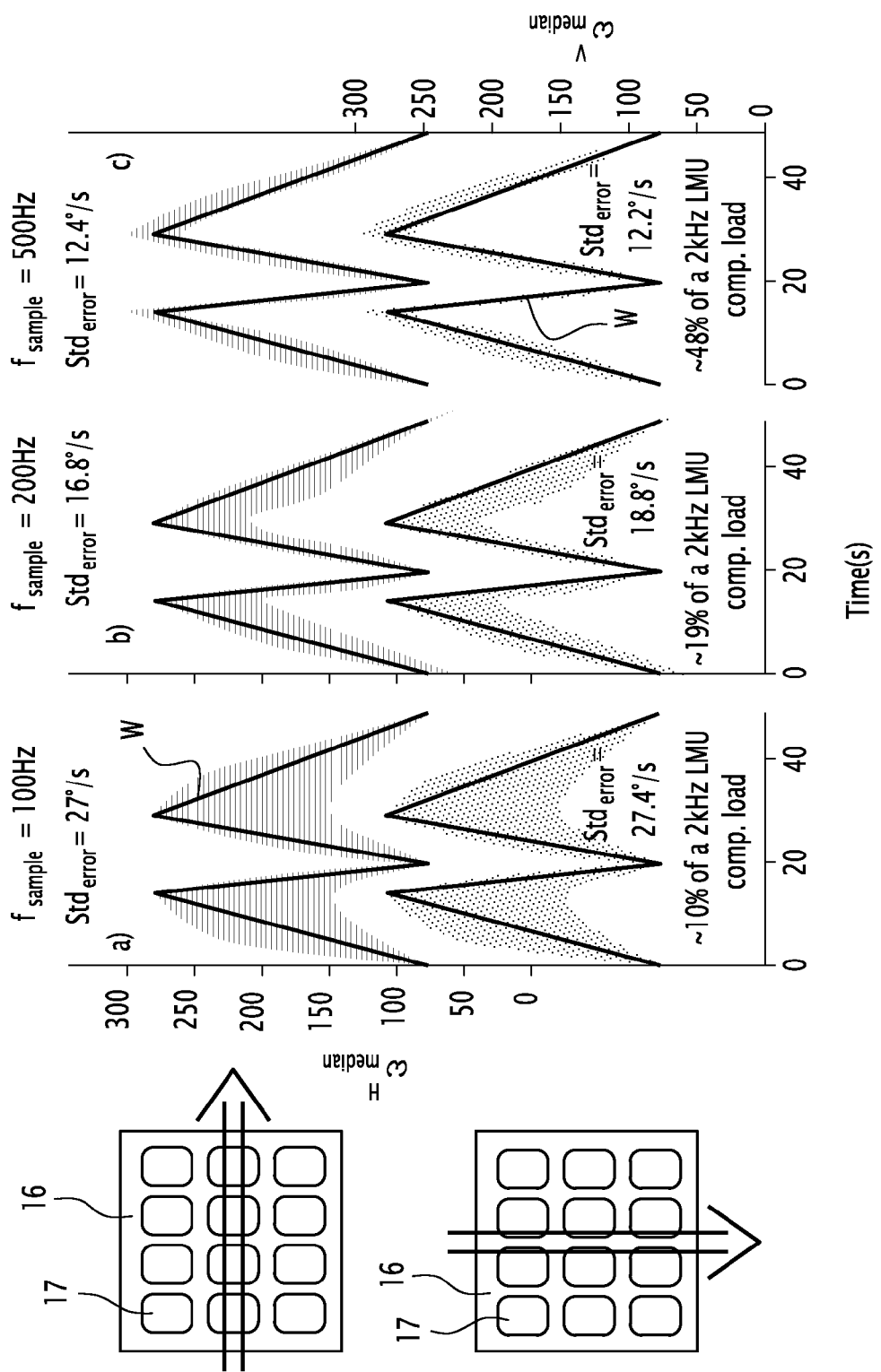
FIG. 4 shows experimental results for different reduced sampling frequencies.

The results of the experiment for each of the three chosen sampling frequencies are shown in FIG. 4. The upper half of FIG. 4 shows the results for $\omega_{median}^H$ and the lower half the results for $\omega_{median}^V$.

The horizontal output ($\omega_{median}^H$) and the vertical output ($\omega_{median}^V$) of the motion sensor assembly follow the saw tooth shape M. As expected, the data dispersion decreases when the sampling frequency increases, namely from a standard deviation of 27°/s at 100 Hz to a standard deviation of 12°/s at 500 Hz.

FIG. 4 also indicates the reduction in computational load compared to the 2 kHz sampling without linear interpolation known from article A. By decreasing the sampling frequency and by keeping the similar number of instructions, the computational load of the processing unit was decreased. The computational load is divided by 10, 5 and 2 at a sampling frequency of 100, 200 and 500 Hz respectively.

The experiments show that the inventive linear interpolation is best combined with a sampling frequency of 200 Hz. At 200 Hz, one has the best compromise between computational load and measurement precision. In this case, the standard deviation of the error is below 20°/s and the computational load is five times lower than the one of a photoreceptor array sampling at 2 kHz without interpolation. Despite the low sampling frequency used, thanks to the inventive linear interpolation, the Nyquist-Shannon sampling theorem is still respected due to the spatial (Gaussian angular sensitivity of the photoreceptors 17) and temporal low-pass filtering (analog and digital filtering stages 20 and 26).

First trials were performed on a dsPIC 33FJ128GP804 microcontroller at a 200 Hz sampling frequency with linear interpolation and 50 Million Instructions Per Second (MIPS). The following table shows the tested sampling frequencies, with the corresponding average and peak percentages of processor load.

| Sampling frequency (Hz) | % processor load (average) | % processor load (peak) |
|---|---|---|
| 2000 | 84 | >100 |
| 500 | 21 | 32 |
| 200 | 10.5 | 16 |
| 100 | 5.25 | 8 |

Thanks to the decrease of the sampling frequency and the inventive delay determining—thresholding and interpolating the signals DS1' and DS2' stage 28 to compute the time delay $\Delta t$ on the visual signals, it becomes possible to implement 17 bidirectional motion sensors based on a 3×4 photosensors array on a single microcontroller with an average processor load of only 10.5%.

The above tests were carried out with an interreceptor angle $\Delta \phi$ of 4°. This corresponds to a motion sensor assembly able to measure angular speeds in the range of [30, 350°/s]. Such a range is typical of the stimulations received by an UAV flying at low altitude (around 1 m above ground) with a speed in the order of 2 m/s.

However, an UAV flying at high altitude at around the same speed would experience smaller angular speeds. In this case, the measured temporal delays $\Delta t$ would be greater. Accordingly, the sampling frequency could be reduced even further without loss in measurement accuracy.

The assembly according to the invention allows, with the help of a retina of some pixels and with limited calculation resources to determine the angular velocity of the scrolling of contrasts in its field of view.

This type of sensor has a major interest for the detection of the proximity of obstacles, especially in the automotive sector and in aerospace.

Because of their low cost, motion sensors according to the invention may be arranged around a motor vehicle. By reducing the computational load allowed by the interpolation, the number of pixels processed by the same calculation unit is multiplied, which allows the detection of obstacles in several directions simultaneously or to increase the accuracy of the sensor by multiplying the number of sensors covering the same area.

In addition, this type of sensor has the advantage that it can operate in a wide range of background illuminance.

Other types of applications are also possible with the motion sensor assembly according to the invention.

It will be understood that the above description of the present invention is susceptible to various modifications, changes and adaptations and the same are intended to be comprehended within the meaning and range of equivalents of the appended claims.

The invention claimed is:

1. A motion sensor assembly adapted to determine an angular velocity of a moving contrast in a field of view of said motion sensor assembly, said motion sensor assembly comprising:
   at least one motion sensor with a first and a second analog photoreceptors each adapted for observing said moving contrast, wherein said first and second photoreceptors are separated by a predetermined interreceptor angle; and
   an angular velocity calculating unit connected to said first and second photoreceptors for calculating said angular velocity of said moving contrast based on a first and a second analog signal delivered by said first and second photoreceptors, respectively;
   wherein said angular velocity calculating unit comprises a sampler configured to temporally sample said first and second analog signals delivered by said first and second photoreceptors at a given sampling frequency to obtain a first and a second digital signal respectively;
   wherein said angular velocity calculating unit further comprises an interpolator configured to interpolate said first and second digital signals upon a crossing of a predetermined threshold by said first and second digital signals between successive samples; wherein said angular velocity calculating unit further comprises a filter configured to output a first and a second filtered digital signal from said first and second digital signals.

2. The motion sensor assembly of claim 1, wherein said interpolator comprises:
   a detector configured to detect said crossing, by said first and second digital signals, of said predetermined threshold;
   the interpolator, which is configured to interpolate said first interpolated time of said crossing by said first digital signal and said second interpolated time of said crossing by said second digital signal; and
   an estimator configured to estimate said delay in said crossing between said first and second digital signals based on said first and second interpolated times.

3. The motion sensor assembly of claim 1, said interpolator comprises:
   a detector configured to detect said crossing, by said first and second digital signals, of said predetermined threshold;
   the interpolator, which is configured to interpolate:
      a) a first interpolated time interval between said crossing by said first digital signal and said crossing by a next sample of said first digital signal; and
      b) a second interpolated time interval between said crossing by said second digital signal and said crossing by a next sample of said second digital signal ; and
   an estimator configured to estimate a delay in said crossing between said first and second digital signals based on said first and second interpolated time intervals;
   and wherein said angular velocity calculating unit further comprises a calculator configured to calculate said angular velocity by dividing said predetermined interreceptor angle by said delay.

4. The motion sensor assembly of claim 1, wherein said given sampling frequency is between 0.01 and 1000000 Hz.

5. The motion sensor assembly of claim 4, wherein said given sampling frequency is equal to about 200 Hz.

6. The motion sensor assembly of claim 1, wherein said motion sensor assembly comprises an array of photoreceptors.

7. The motion sensor assembly of claim 6, wherein said array of photoreceptors is a 3×4 array.

8. The motion sensor assembly of claim 1, wherein said angular velocity calculating unit comprises a microcontroller.

9. A vehicle equipped with said motion sensor assembly of claim 1.

10. The vehicle of claim 9, wherein said vehicle is a terrestrial, maritime or aerial vehicle, a Micro Aerial Vehicle, motor vehicle, drone or space vehicle.

11. The motion sensor assembly of claim 1, wherein said filter is a low-pass filter.

12. The motion sensor assembly of claim 1, wherein said interpolator comprises:
   a detector configured to detect said crossing, by said first and second digital signals, of said predetermined threshold;
   the interpolator, which is configured to interpolate:
      a) a first interpolated time interval between said crossing by said first digital signal and said crossing by a next sample of said first digital signal; and
      b) a second interpolated time interval between said crossing by said second digital signal and said crossing by a next sample of said second digital signal; and
   an estimator configured to estimate a delay in said crossing between said first and second digital signals based on said first and second interpolated time intervals.

13. A method for determining an angular velocity of a moving contrast, said method comprising the steps of:
   obtaining a first and a second analog signal by observing said moving contrast from a first and a second photoreceptors separated by a predetermined interreceptor angle; and
   temporally sampling said first and second analog signals at a given sampling frequency to obtain a first and a second digital signal, and
   interpolating said first and second digital signals upon a crossing of a predetermined threshold by said first and second digital signals between successive samples, wherein a filtering step is provided outputting a first and a second filtered digital signal from said first and second digital signals.

14. The method of claim 13, wherein said interpolating comprises:
   detecting said crossing, by said first and second digital signals, of said predetermined threshold;
   interpolating said first interpolated time of said crossing by said first digital signal and said second interpolated time of said crossing by said second digital signal; and
   estimating a delay in said crossing between said first and second digital signals based on said first and second interpolated times.

15. The method of claim 13, wherein said interpolating comprises:
  detecting said crossing, by said first and second digital signals, of said predetermined threshold;
  interpolating:
   a) said first interpolated time interval between said crossing by said first digital signal and a next sample of a first filtered digital signal; and
   b) said second interpolated time interval between said crossing by said second digital signal and a next sample of a second filtered digital signal; and
  estimating said delay in said crossing between said first and second digital signals based on said first and second interpolated time intervals,
  and wherein the method further comprises calculating an angular velocity by dividing said predetermined inter-receptor angle by said delay.

16. The method of claim 13, wherein said given sampling frequency ($f_{sample}$) is between 100 and 500 Hz.

17. The method of claim 16, wherein said given sampling frequency is equal to about 200 Hz.

18. The method of claim 13, wherein said interpolating is a linear interpolating.

19. The method of claim 13, wherein said interpolating comprises:
  detecting said crossing, by said first and second digital signals, of said predetermined threshold;
  interpolating:
   a) said first interpolated time interval between said crossing by said first digital signal and a next sample of a first filtered digital signal; and
   b) said second interpolated time interval between said crossing by said second digital signal and a next sample of a second filtered digital signal; and
  estimating said delay in said crossing between said first and second digital signals based on said first and second interpolated time intervals.

* * * * *